United States Patent [19]

Ohta

[11] Patent Number: 5,448,376
[45] Date of Patent: Sep. 5, 1995

[54] IMAGE PROCESSING APPARATUS FOR DELETING UNDESIRED IMAGE FROM IMAGE OF DOCUMENT

[75] Inventor: Junichi Ohta, Yokohama, Japan

[73] Assignee: Ricoh Company, Ltd., Tokyo, Japan

[21] Appl. No.: 828,167

[22] Filed: Jan. 30, 1992

[30] Foreign Application Priority Data

Jan. 31, 1991 [JP] Japan ................................. 3-031825

[51] Int. Cl.⁶ ........................ H04N 1/40; H04N 1/387
[52] U.S. Cl. ................................. 358/448; 358/452; 382/254; 382/296
[58] Field of Search ............... 358/448, 452, 453, 401, 358/537; 382/10, 48, 61, 46, 54; 355/218

[56] References Cited

U.S. PATENT DOCUMENTS 4,852,183  7/1989  Abe et al. ............................. 382/61
5,182,656  7/1993  Chevion et al. ..................... 358/452

*Primary Examiner*—Scott A. Rogers
*Assistant Examiner*—Thomas D. Lee
*Attorney, Agent, or Firm*—Oblon, Spivak, McClelland, Maier & Neustadt

[57] ABSTRACT

An image processing apparatus for deleting an undesired image from an image includes a scanning part, an image memory for storing an image of a document being scanned, a delete-image memory for storing predetermined standard geometry parameters with respect to a delete image, the standard geometry parameters defining a predetermined configuration of the delete image, a candidate fetching part for fetching a candidate image from the stored image of the document based on the standard geometry parameters, a candidate rotating part for rotating the candidate image, a discrimination part for detecting whether or not the candidate image is a delete image by comparing a configuration of the rotated candidate image with the predetermined configuration of the delete image, a deletion part for deleting the detected candidate image from the stored image of the document if it is detected that the candidate image is a delete image, and an output part for outputting the stored image in the image memory from which the detected candidate image is deleted.

11 Claims, 14 Drawing Sheets

| START(X) | START(Y) | LENGTH(X) | LENGTH(Y) |
|----------|----------|-----------|-----------|
| i | j | 5 | 4 |
| ⋮ | ⋮ | ⋮ | ⋮ |

~12a

FIG. 14A
FIG. 14B
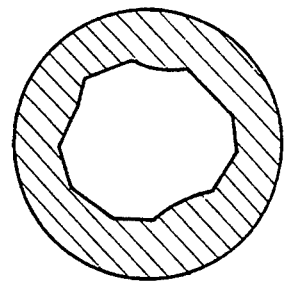
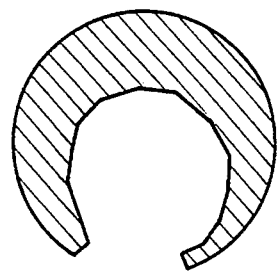
FIG. 14C
FIG. 14D
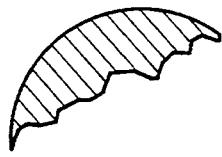
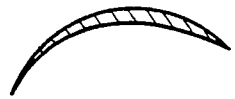

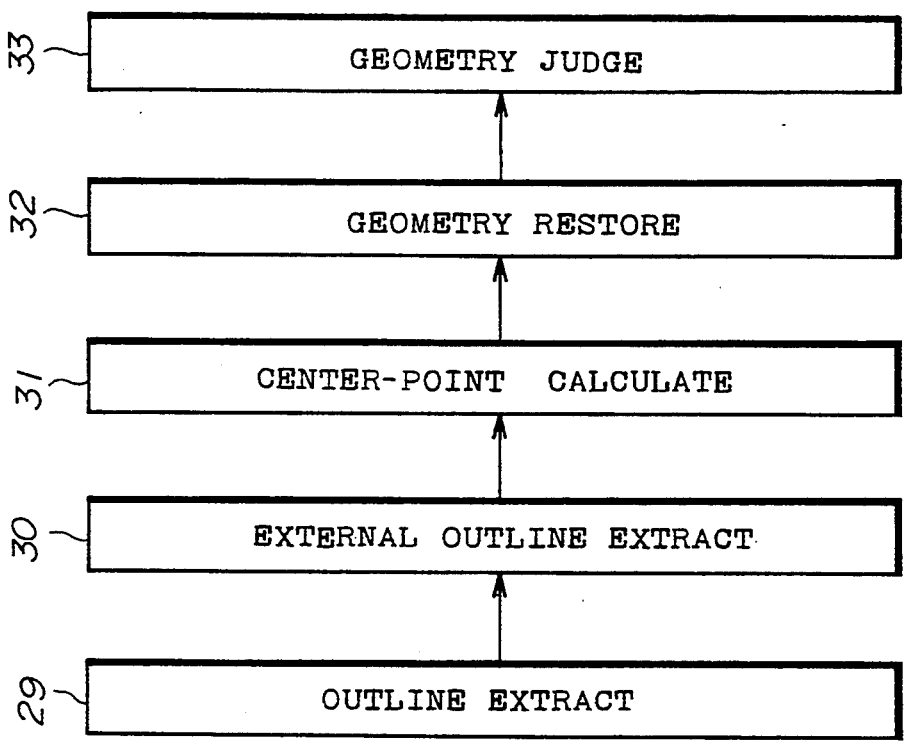

FIG.18A  FIG.18B
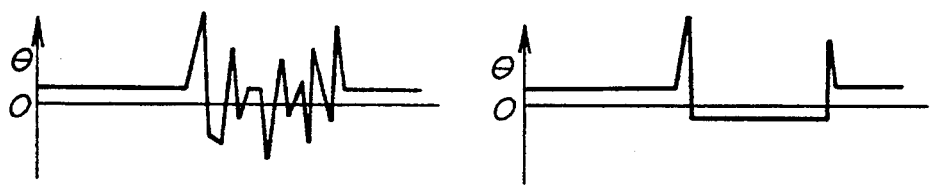
FIG.19A  FIG.19B
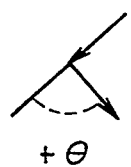  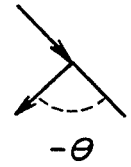
+θ  −θ
FIG.20A  FIG.20B
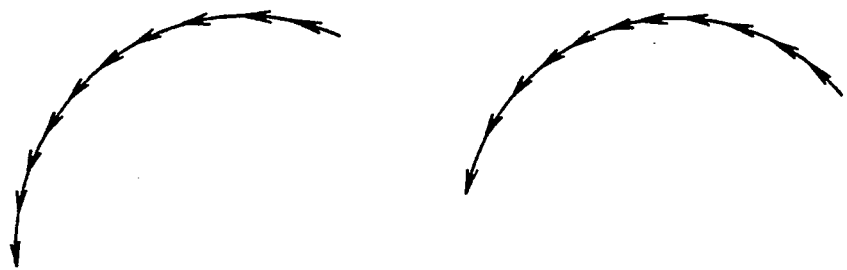

IMAGE PROCESSING APPARATUS FOR DELETING UNDESIRED IMAGE FROM IMAGE OF DOCUMENT

BACKGROUND OF THE INVENTION

The present invention generally relates to an image processing apparatus, and more particularly to an image processing apparatus for automatically deleting an undesired image from an image of a document which is scanned, which apparatus is applicable to digital copiers and facsimile machines dealing with digital input/output image data.

Conventionally, in an image processing system such as a digital copier, an undesired image appears together with an image of a document when a document with holes or a document with a staple is scanned and processed. One conceivable method for removing such an undesired image from image of the document is to cover the staple or the holes with additional white paper. Another method is to designate the location of an undesired image in a document as a delete area, so that the image in the designated area is deleted by an image edit function of an image processing system. However, it is necessary to perform such work as covering the staple or holes with additional paper or utilizing the image edit function, when a document with a staple or a document with holes is scanned and processed with the image processing apparatus. This costs the users additional time and labor.

SUMMARY OF THE INVENTION

Accordingly, it is a general object of the present invention to provide an improved image processing apparatus in which the above described problems are eliminated.

Another and more specific object of the present invention is to provide an image processing apparatus in which an undesired image such as a staple is automatically deleted from a stored image of a document if a document with a staple is scanned and processed. The above mentioned object of the present invention can be achieved by an image processing apparatus which includes a scanning part, an image memory for storing an image of a document read out when the document is scanned by the scanning part, a delete-image memory for storing predetermined standard geometry parameters with respect to a delete image to be deleted from the stored image of the document, the standard geometry parameters defining a predetermined configuration of the delete image, a candidate fetching part for fetching a candidate image from the stored image of the document in the image memory based on the standard geometry parameters stored in the delete-image memory, a candidate rotating part for rotating the candidate image fetched by the candidate fetching part so that a longitudinal direction of the rotated candidate image accords with either a main scan line or a sub scan line of the scanning part along which the document is scanned, a discrimination part for detecting whether or not the candidate image is a delete image by comparing a configuration of the rotated candidate image from the candidate rotating part with the predetermined configuration of the delete image stored in the delete-image memory, a deletion part for deleting the detected candidate image from the stored image of the document in the image memory if the discrmination part detects that the candidate image is a delete image, and an output part for outputting the stored image in the image memory from which the detected image is deleted by the deletion part. According to the present invention, it is possible to automatically delete an undesired image from the image of a document with a staple being scanned, and output only the actual image of the document. This is achieved by storing standard geometry parameters with respect to an image of a staple in the delete-image memory, and it is unnecessary to perform additional work, which is helpful to the users.

Still another object of the present invention is to provide an image processing apparatus in which undesired images such as punch holes are automatically deleted from a stored image of a document if a document with holes is scanned and processed. The above mentioned object of the present invention can be achieved by an image processing apparatus which includes a scanning part, an image memory for storing an image of a document read out when the document is scanned by the scanning part, a delete-image memory for storing predetermined standard geometry parameters with respect to delete images to be deleted from the stored image of the document, the standard geometry parameters defining a predetermined configuration of the delete images and a predetermined distance between the delete images, a candidate fetching part for fetching candidate images from the stored image of the document in the image memory based on the standard geometry parameters stored in the delete-image memory, a geometry discriminating part for detecting whether or not a configuration of each of the candidate images from the candidate fetching part is substantially the same as the predetermined configuration stored in the delete-image memory, a distance calculating part for calculating a distance between the candidate images based on the data generated by the geometry discriminating part, a discrimination part for detecting whether or not the candidate images from the candidate fetching part are delete images by comparing the calculated distance from the distance calculating part with the predetermined distance stored in the delete-image memory, a deletion part for deleting the detected candidate images from the discrimination part from the stored image of the document in the image memory if the discrimination part detects that the candidate images are delete images, and an output part for outputting the stored image of the document in the image memory from which the detected images are deleted by the deletion part. According to the present invention, it is possible to automatically delete undesired images from the image of a document with holes being scanned, and output only the actual image of the document. This is achieved by storing standard geometry parameters with respect to images of punch holes in the delete-image memory, and it is unnecessary to perform additional work, which is helpful to the users.

Other objects and further features of the present invention will be apparent from the following detailed description when read in conjunction with the accompanying drawings.

BRIEF DESCRIPTION OF THE DRAWINGS

FIGS. 14A through 14D are views showing several candidate images fetched by the candidate fetching part;

FIG. 15 is a block diagram showing a construction of a geometry discriminating part of the apparatus;

FIGS. 18A and 18B are charts for explaining changes of angular differences between two of the outline vectors calculated by the outline extracting part;

FIGS. 19A and 19B are diagrams for explaining an angular difference between two outline vectors calculated by the outline extracting part;

FIGS. 20A and 20B are views showing an outermost outline extracted by an outermost-outline extracting part from corresponding outline vectors;

DESCRIPTION OF THE PREFERRED EMBODIMENTS

Figure 1:
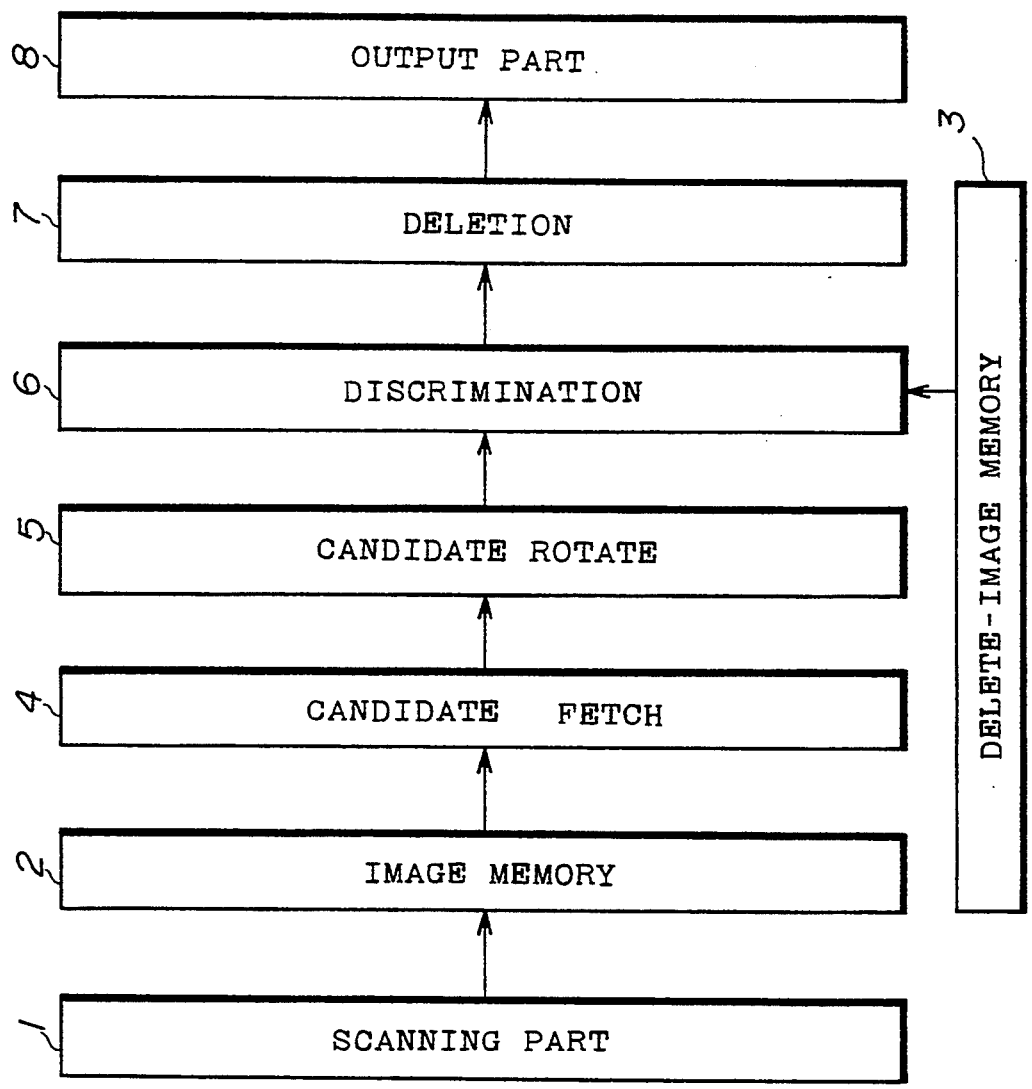
FIG. 1 is a block diagram showing a construction of an image processing apparatus in a first embodiment of the invention.

A description will now be given of an image processing apparatus in a first embodiment of the present invention, with reference to FIGS. 1 through 10. In FIG. 1, this image processing apparatus includes a scanning part 1, an image memory 2 in which an image of a document read out when the scanning part 1 scans the document is stored, and a delete-image memory 3 in which predetermined standard geometry parameters with respect to a delete image to be deleted from the image of the scanned document are stored, the standard geometry parameters defining a predetermined configuration of the delete image. The image processing apparatus shown in FIG. 1 includes a candidate fetching part 4, a candidate rotating part 5, a discrimination part 6, a deletion part 7, and an output part 8. The candidate fetching part 4 generates a candidate image by fetching it from the stored image in the image memory 2 based on the standard geometry parameters stored in the delete-image memory 3. The candidate rotating part 5 rotates the candidate image fetched by the candidate fetching part 4 so that a longitudinal direction of the candidate image accords with either a main scan line or a sub scan line of the scanning part 1 along which the document is scanned.

The discrimination part 6 detects whether or not the candidate image is a delete image by comparing a configuration of the rotated candidate image from the candidate rotating part 5 with the predetermined configuration of the stored image in the delete-image memory 3. The deletion part 7 deletes the candidate image from the stored image in the image memory 2 if the discrmination part 6 judges that the candidate image is a delete image. The output part 8 outputs the stored image in the image memory 2 from which the delete image is deleted by the deletion part 7.

Figure 2:
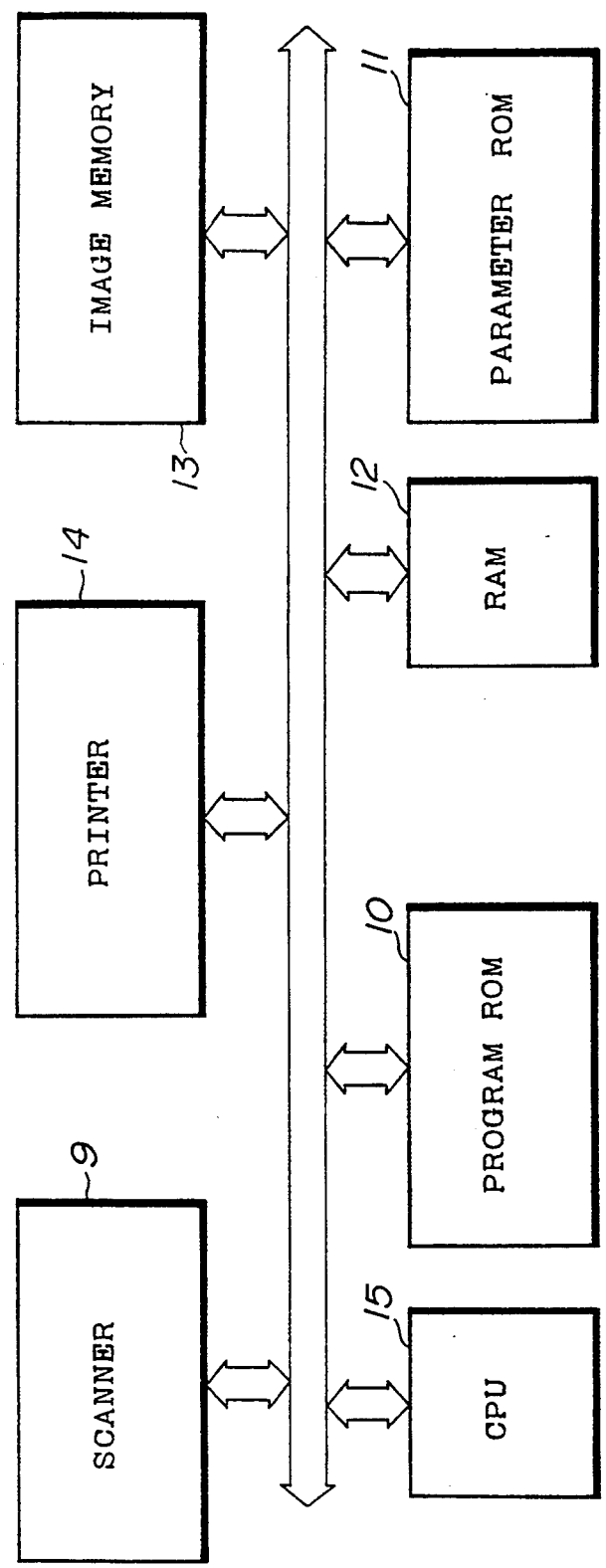
FIG. 2 is a block diagram showing a construction of the hardware of an image processing system to which the present invention is applied.

FIG. 2 shows a construction of the hardware of an image processing system such as a digital copier, to which an embodiment of the present invention is applied. In FIG. 2, a scanner 9 of this image processing system forms the above described scanning part 1 shown in FIG. 1. Several control programs of the image processing system including an image processing control program are stored in a program ROM (read-only memory) 10, and the control programs are executed by a CPU 15 of the image processing system. Standard geometry parameters each indicating a predetermined configuration of a delete image are stored in a parameter ROM (read-only memory) 11, and this delete image is, for example, an undesired image produced owing to a stapled document with a staple which document is scanned and processed. This parameter ROM 11 forms the delete-image memory 3 in FIG. 1. A RAM (random access memory) 12 shown in FIG. 2 is used as a memory having working areas in which intermediate data is stored when a control program in the program ROM 10 is executed. An image memory 13 forms the above image memory 2 in FIG. 1, and the image of a document read out when the document is scanned by the scanner 9 is stored in this image memory 13.

A printer 14 shown in FIG. 2 which forms the above output part 8 shown in FIG. 1, outputs the stored image in the image memory 13. As shown in FIG. 2, the scanner 9, the program ROM 10, the parameter ROM 11, the RAM 12, the image memory 13, the printer 14, and the CPU 15 are interconnected via a bi-directional bus, and each data required when the image processing system carries out an image processing operation is transmitted or received through the bi-directional bus.

Figure 3:
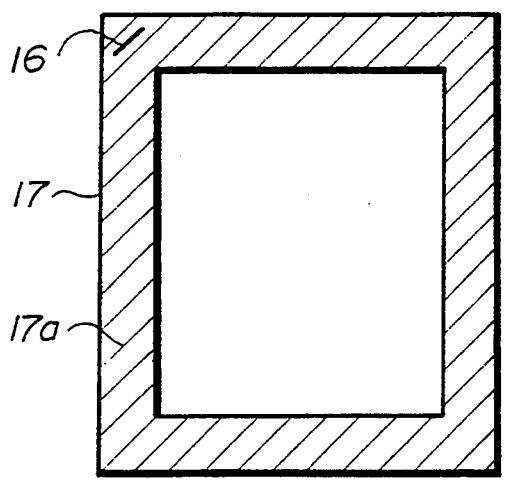
FIG. 3 is a view showing an image of a document with a staple being scanned by a scanning part, which image is stored in an image memory.

FIG. 3 shows an image of a document with a staple which is obtained by scanning the document with the scanning part and stored in the image memory 13 of the above described image processing system. This document 17 is stapled with a staple 16 at an upper left-hand corner portion of the document. The staple 16 generally is located in a peripheral portion 17a of the document 17, which peripheral portion 17a is indicated with shading lines in FIG. 3. The document 17 with the staple 16 is placed on an exposure glass plate (not shown) of the image processing system, and is scanned by the scanner 9 so that the image of the scanned document is stored in the image memory 13. The data stored in the image memory 13 is made of binary digital data. The document on the exposure glass plate is exposed to scanning light from the scanner 9, and a light beam reflected from the document is photoelectrically converted into a binary image signal. An image of the document 17 with the staple 16 described by such an image signal is stored in the image memory 13, as shown in FIG. 3.

A candidate image, which may be an undesired image owing to a staple of a document, is fetched by the candidate fetching part 4 from data of the stored image in the image memory 13, which data includes only data corresponding to the peripheral portion 17a of the document 17. From such image data in the image memory 13, a candidate image is fetched which includes a set of successive black picture elements whose size is equivalent to a size of the image of the staple 16, and this candidate image may be a staple image to be deleted from an output copy.

The candidate fetching part 4 according to the present invention performs an outline tracing procedure, and after the outline tracing procedure is performed the candidate fetching part 4 performs a candidate selecting procedure so that a candidate image which may be a delete image owing to a staple of a document is fetched from the stored image in the image memory 2, based on the stored image in the delete-image memory 3.

In the outline tracing procedure, the data of image read out from a scanned document is raster scanned, and a start black picture element from which a tracing of an outline of a candidate image is started is found in a set of successive black picture elements in the image data. Starting from the start black picture element, the outline is traced by searching for a new outline vector that subsequently forms part of the outline, so that a chain of outline vectors is produced and a closed loop of the outline is completed. When the outline of the candidate image is formed as the outermost part of the image, the tracing is performed counterclockwise around a center picture element. When the outline is formed as an inner part of the image, the tracing is performed clockwise around a center picture element.

Each tracing procedure with respect to a set of successive black picture elements is completed when the tracing of the outline returns back to the start black picture element and the chain of outline vectors ends with the start black picture element to complete a closed-loop outline. This outline tracing procedure is repeated until no more black picture elements with which the tracing of the outline is performed on can be found in the image data.

Figure 4:
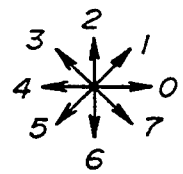
FIG. 4 is a diagram showing directions of outline vectors used when a tracing of an outline is performed.
Figure 5:
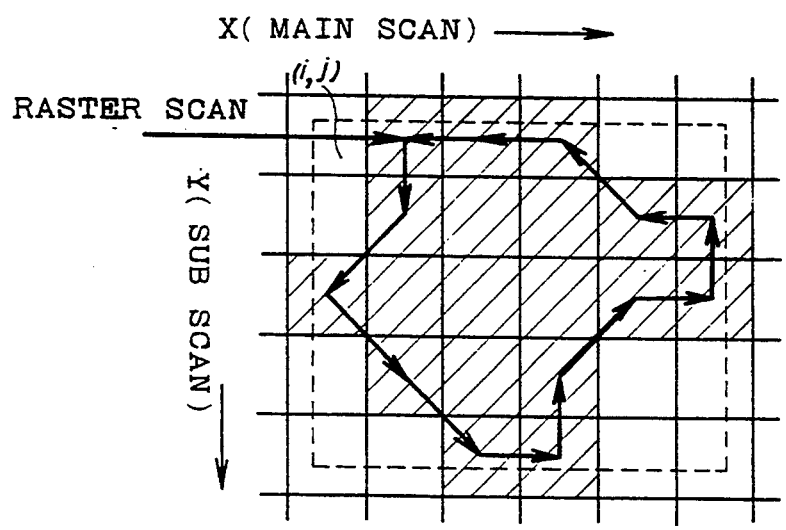
FIG. 5 is a diagram for explaining an outline tracing procedure which is performed by a candidate fetching part.

A detailed description will now be given of the outline tracing procedure, which is performed by the candidate fetching part 4, by referring to FIGS. 4 and 5. FIG. 4 shows directions of outline vectors in which a tracing of an outline is performed, and there are illustrated eight directions "0" through "7" of outline vectors used in the outline tracing procedure. FIG. 5 shows an example of an outline tracing procedure performed by the candidate fetching part 4.

In the outline tracing procedure, a raster scan is carried out with respect to the image data obtained from a scanned document. In this raster scan, a main scan is made to the image data in a horizontal direction indicated by an arrow X in FIG. 5 (which is a widthwise direction of the image), and a sub scan is also made to the image data in a vertical direction perpendicular to a main scan line, indicated by an arrow Y in FIG. 5 (which is a lengthwise direction of the image). In FIG. 5, assume that a start black picture element is found at coordinate (i+1, j) after the raster scan is carried out to the image data, and that it is detected, from a fact that the previous picture element at coordinate (i,j) is a white picture element, that an outline forms the outermost part of the image. Picture elements in the image data in the neighborhood of the start black picture element are checked counterclockwose around the start black picture element, and a next black picture element first detected in the checking is selected so as to create an outline vector having a direction from the start picture element to the next picture element. Next, a center picture element around which the outline tracing is performed is changed into the next picture element. Picture elements in the neighborhood of the center picture element are checked counterclockwise from a direction (whose direction number of the vector shown in FIG. 4 is selected by subtracting "2" from a direction number of the previous outline vector). Subsequent outline vectors and center picture elements are selected by repeating the same procedure until the outline tracing is returned back to the start picture element and a chain of outline vectors becomes a closed loop at the start picture element, as shown in FIG. 5. In this manner, the outline tracing procedure is performed with respect to each set of successive black picture elements in the image data of the document stored in the image memory 13.

Figures 6, 7:
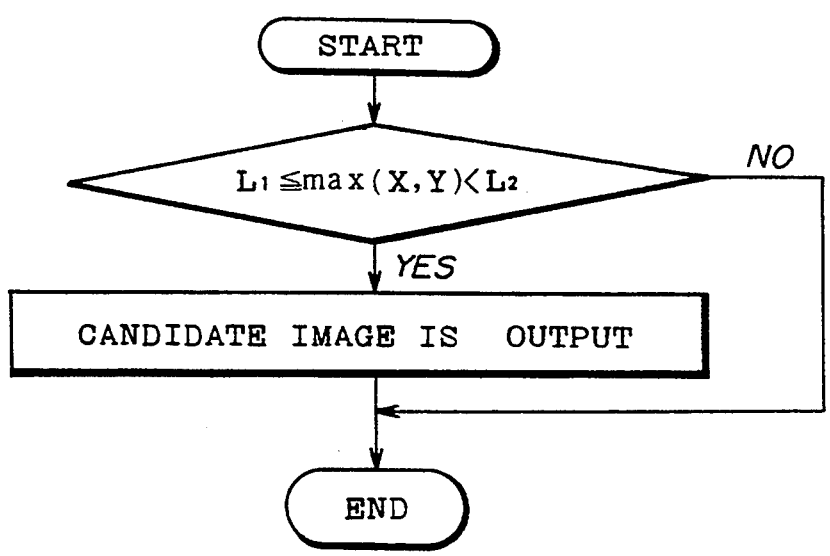
FIG. 6 is a diagram showing a memory map of outline data which is stored in a random access memory.
FIG. 7 is a flow chart for explaining a candidate selection procedure performed by a candidate fetching part.

The candidate fetching part 4 generates an outline data when the outline of the candidate image is formed as the outermost part of the image, and this outline data is stored in an outline data area 12a of the RAM 12 as shown in FIG. 6. The outline data stored in the RAM 12 includes a start position (X) (the minimum X coordinate), a start position (Y) (the minimum Y coordinate), a length (X) of the outline in an X direction (the maximum X coordinate minus the minimum X coordinate), and a length (Y) of the outline in a Y direction (the maximum Y coordinate minus the minimum Y coordinate). An outline data corresponding to an example of the outline tracing shown in FIG. 5 is as shown in a first row of the outline data area 12a in FIG. 6 in which the start position (X) is "i", the start position (Y) is "j" the length (X) is 5 and the length (Y) is 4.

Based on the outline data generated when the outline tracing procedure is done, the candidate fetching part 4 performs a candidate image selecting procedure by checking whether or not an image inside the outline is a candidate image which may be an image of the staple of the scanned document. In accordance with the sizes of staples used in a document, a minimum length L1 and a maximum length L2 of a candidate image are predetermined. As shown in the flow chart of FIG. 7, the candidate fetching part 4 detects whether or not one of the length (X) in an X direction and the length (Y) in a Y direction of the outline stored in the RAM 12, whichever has a greater value of the length, is greater than (or equal to) the predetermined minimum length L1, and is smaller that the predetermined maximum length L2. If both the requirements are satisfied, it is detected that the image inside the outline is a candidate image for a delete image owing to a staple of a document. The candidate fetching part 4 fetches the candidate image from the image of the document stored in the image memory 2, and the fetched candidate image is supplied to the candidate rotating part 5, and the candidate image selecting procedure is completed. If the above requirements are not satisfied, it is determined that the image inside the outline is not a candidate image.

Figure 8B:
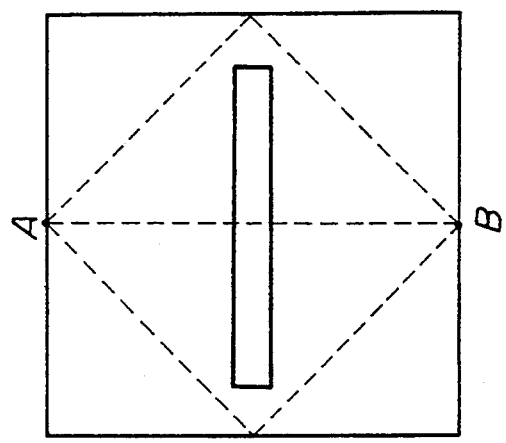
FIG. 8A is a view showing a candidate image fetched by the candidate fetching part and FIG. 8B is a view showing a candidate image rotated by a candidate rotating part.
Figure 8A:
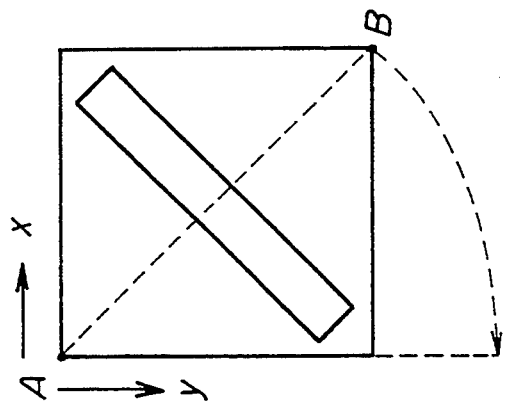

The candidate fetching part 4 generates data of a candidate image included in a minimum rectangular region, as shown in FIG. 8A. Based on the data generated by the candidate fetching part 4, the candidate rotating part 5 rotates the candidate image around an upper-left corner point A of the rectangular region in a manner that an opposite corner point B of the rectangular region diagonally opposed to the point A is rotated and moved to a point on a vertical line which is parallel with the sub scan direction Y. FIG. 8B shows the candidate image after the rotation is performed by the candidate rotating part 5, and this candidate image, which may be a staple image, is arranged in a horizontal attitude in a direction parallel with the main scan direction X. In the case in which the length of one side of the rectangular region surrounding the candidate image generated by the candidate fetching part 4 is almost equal to a length of the staple, it is judged that the candidate image is already arranged in a horizontal or vertical attitude. In such a case, the candidate rotating part 5 does not rotate the candidate image.

Figure 9:
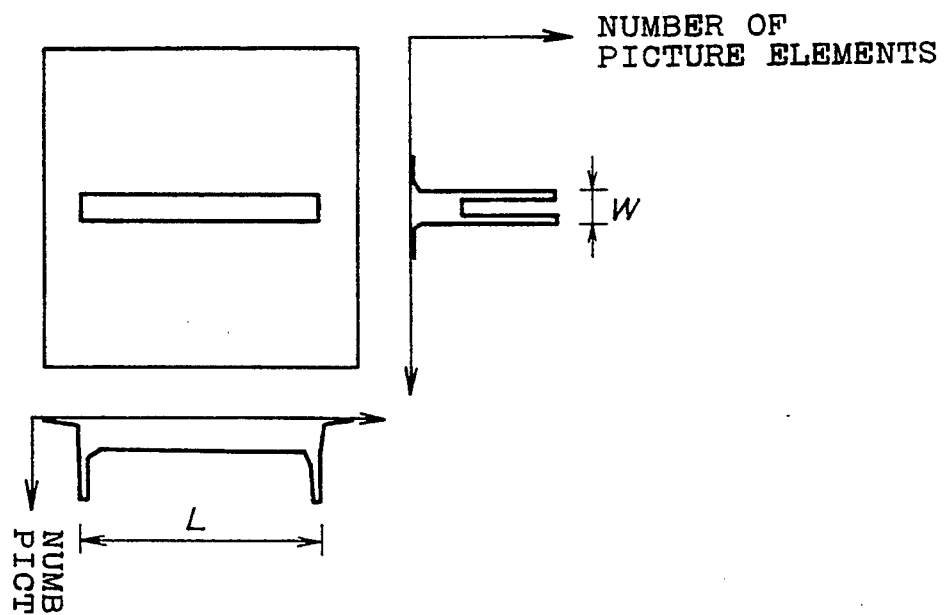
FIG. 9 is a diagram for explaining a counting of picture elements in the candidate image performed by a discrimination part.

The discrimination part 6 counts black picture elements, included in the data of the candidate image rotated by the candidate rotating part 5, in the horizontal direction X (the main scan direction), and counts black picture elements in the vertical direction Y (the sub scan direction). FIG. 9 shows the results of the counting of picture elements performed by the discrimination part 6. After the counting is done, the discrimination part 6 generates a length L of the candidate image if the counted number of picture elements at a corresponding portion in the horizontal direction X is larger than a predetermined threshold value, and generates a width W of the candidate image if the number of picture elements at a corresponding portion in the vertical direction Y is larger than a predetermined threshold value.

The standard geometry parameters stored in the parameter ROM 11 include maximum and minimum values of each of the staple's width and length. If each of the generated length L and width W of the candidate image is greater than the corresponding minimum value and smaller than the corresponding maximum value in the standard geometry parameters stored in the parameter ROM 11, the discrimination part 6 detects that the candidate image is a delete image that is produced owing to the staple of the document, and generates data of the detected image included in a minimum rectangular region.

Figure 10:
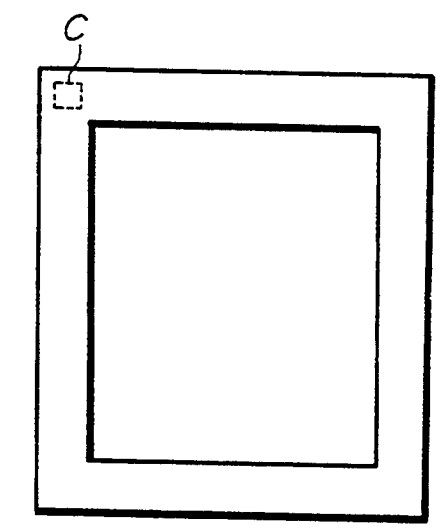
FIG. 10 is a view showing an image of the document stored in the image memory from which a delete image is deleted by a deletion part.

Based on the data generated by the discrimination part 6, the deletion part 7 deletes the detected image from the image of the scanned document stored in the image memory 13. FIG. 10 shows image of a document stored in the image memory 13 from which a delete image in a minimum rectangular region C is deleted. Finally, the printer 14 outputs the image stored in the image memory 13 on a copy paper so that the image is recorded onto the paper. Accordingly, it is possible for the image processing apparatus of the invention to automatically delete an undesired image of a staple and record the actual image of a scanned document with no undesired staple image. Predetermined standard geometry parameters related to a delete image to be deleted from the image of the document are stored in the parameter ROM 11 (corresponding to the delete-image memory 3).

In the above described embodiment, only a staple image is set as a delete image, and the image processing apparatus is applicable to a digital copier in which a document is scanned by one scan so that image of the scanned document is entered into the image memory and the image of the document is recorded onto a copy paper with no undesired image. However, the present invention is not limited to this embodiment. Image of other items different from a staple can be set as the delete image. The present invention is applicable to digital copiers or facsimile machines which can deal with multi-level image data. For example, in a modified image processing apparatus dealing witch multi-level image data, a document is scanned in a first scan so that binary data of image of the scanned document is stored and a configuration of the image is compared with a predetermined standard configuration to generate a delete image in a given rectangular region. The same document is again scanned in a second scan so that multi-level data of image of the document is stored and the detected image is deleted from the stored multi-level image data.

Figure 11:
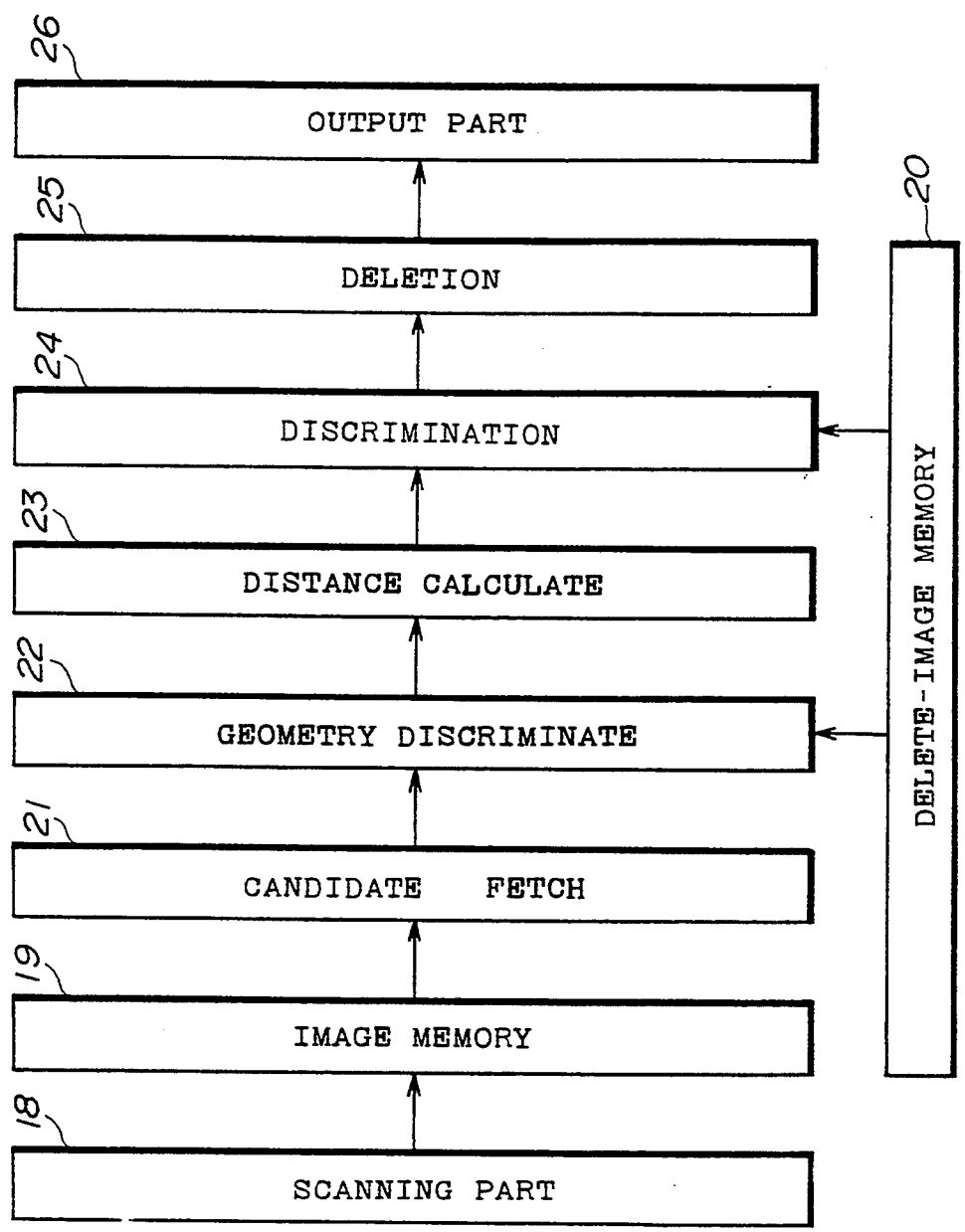
FIG. 11 is a block diagram showing a construction of an image processing apparatus in a second embodiment of the present invention.

Next, a description will be given of a second embodiment of the present invention, with reference to FIGS. 11 through 25. In FIG. 11, the image processing apparatus includes a scanning part 18, an image memory 19 in which image of a document read out when the scanning part 18 scans the document is stored, and a delete-image memory 20 in which a delete image of punch holes to be deleted from the image of the scanned document are stored, the delete image including predetermined standard geometry parameters and a predetermined distance between the punch holes. The image processing apparatus shown in FIG. 11 includes a candidate fetching part 21, a geometry discriminating part 22, a distance calculating part 23, a discrimination part 24, a deletion part 25 and an output part 26. The candidate fetching part 21 generates plural candidate images by fetching them from the stored image in the image memory 19 based on the stored data in the delete-image memory 20.

The geometry discriminating part 22 detects whether or not a configuration of the candidate images is substantially the same as that of delete images by comparing a configuration of the candidate images generated by the candidate fetching part 21 with the predetermined configuration of the stored images in the delete-image memory 20. If it is detected that the candidate images and the delete images are substantially of the same configuration. The distance calculating part 23 calculates a distance between the candidate images. The discrimination part 24 detects whether or not the candidate images are delete images by comparing the calculated distance from the distance calculating part 23 with the predetermined standard distance stored in the delete-image memory 20. If it is detected that the candidate images are delete images, the deletion part 25 delete the candidate images from the stored image in the image memory 19. The output part 26 outputs the stored image in the image memory 19 from which the delete images are deleted by the deletion part 25.

The above described apparatus in the second embodiment of the invention is applicable to an image processing system such as a digital copier. This image processing system to which the present invention is applied has essentailly the same construction as that of the apparatus shown in FIG. 2. Those parts of this image processing system which are the same as the corresponding parts shown in FIG. 2 are designated by the same reference numerals, and a description thereof will be omitted.

In FIG. 11, the scanning part 18 is formed by the scanner 9 of the image processing system as shown in FIG. 2, the image memory 19 is formed by the image memory 13, the delete-image memory 20 is formed by the parameter ROM 11, and the output part 26 is formed by the printer 14. However, the image processing control program stored in the program ROM 10 and the data of delete images stored in the parameter ROM 11 are different from those in the first embodiment shown in FIG. 2. The image processing control program stored in the program ROM 10 is a program for executing a data processing procedure described below. The standard geometry parameters with respect to delete images of punch holes defining a predetermined configuration, as well as a distance between the delete images, are stored in the parameter ROM 11.

Figure 12:
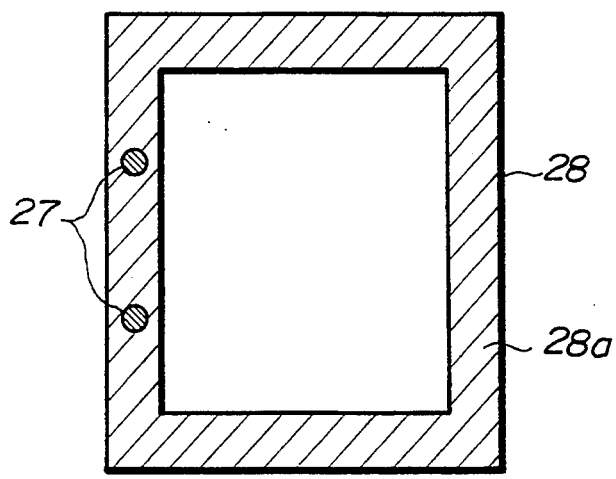
FIG. 12 is a diagram showing an image of a document with holes being scanned, which image is stored in an image memory.

FIG. 12 shows an image of a document with punch holes which is obtained by scanning the document with the scanning part 18 and stored in the image memory 13. This document 28 has punch holes 27 in a left-hand margin of the document. The holes 27 are generally located in a peripheral portion 28a of the document, which peripheral portion is indicated with shading lines in FIG. 12. The document 28 with the holes 27 is placed on the exposure glass plate (not shown) of the image processing system and is scanned by the scanning part 18, and a light beam reflected back from the document is photoelectrically converted into binary digital data so that the digital data of image of the scanned document is stored in the image memory 13.

Candidate images of punch holes are fetched by the candidate fetching part 21 from the data of the stored image in the image memory 13, which data corresponds to the peripheral portion 28a of the document 28. From such image data stored in the image memory 19, candidate images are fetched which include a set of successive black picture elements whose size is equivalent to a size of the punch hole images.

Similarly to the first embodiment, the candidate fetching part 21 performs an outline tracing procedure, and after the outline tracing procedure is performed the candidate fetching part 21 performs a candidate selecting procedure so that candidate images for delete images of the punch holes of the document are fetched from the stored image in the image memory 19, based on the stored image in the delete-image memory 20.

Maximum and minimum sizes of the delete images, used in the candidate selecting procedure in the second embodiment, are predetermined in accordance with the size of the punch holes.

The geometry discriminating part 22 detects whether or not a configuration of the candidate images is substantially the same as that of delete images by comparing a configuration of the candidate images generated by the candidate fetching part 21 with the predetermined configuration of the stored images in the delete-image memory 20.

Figure 13:
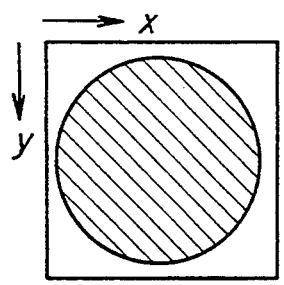
FIG. 13 is a view showing a candidate image of a hole in a scanned document which is fetched by a candidate fetching part from the image of the scanned document.

In the case in which the candidate images from the candidate fetching part 21 have a generally circular outline and shows a completely black dot as shown in FIG. 13, the geometry discriminating part 22 performs a pattern matching of the candidate images with the standard geometry parameters of punch holes stored in the delete-image memory 20. In this pattern matching, for example, a rate of the number of picture elements in the candidate images being matched with picture elements in the standard geometric parameters relative to the total number of picture elements of the candidate images is calculated, and, if the calculated rate is greater than a predetermined value, it is judged that the candidate images and the delete images are substantially of the same configuration.

In the case in which the candidate images have a generally circular outline but do not show a completely black dot (for example, a white region is included in the outline) as shown in FIG. 14A, the geometry discriminating part 22 detects whether or not the candidate images and the delete images are substantially of the same configuration, by comparing only the outermost outline of the candidate images with the standard geometry paramters of the delete images in the delete-image memory 20.

In the case in which the candidate images have only part of a circular outline and other parts are missing, as shown in FIGS. 14B through 14D, a geometry discriminating part 22 shown in FIG. 15 having an outline extracting part 29, an outermost outline extracting part 30, a center-point calculating part 31, a geometry restoring part 32 and a geometry judging part 33, performs each of the necessary procedures which will be described below, so that it detects whether or not the candidate images and the delete images are substantially of the same configuration.

Figure 16:
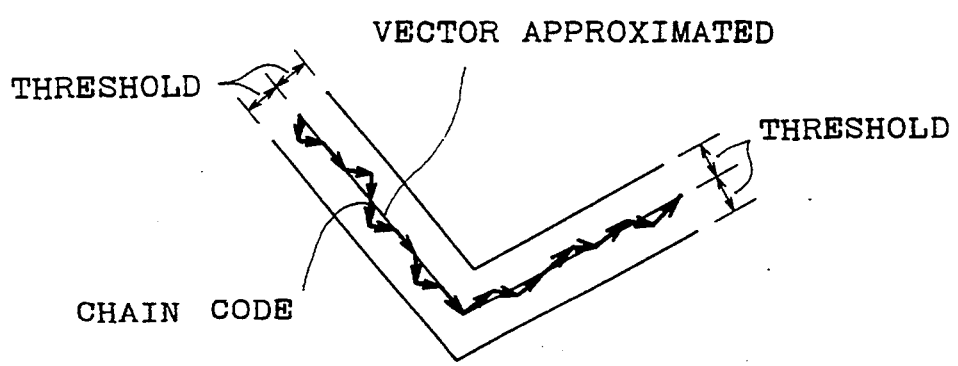
FIG. 16 is a diagram for explaining extraction of outline vectors which is performed by an outline extracting part.

The outline extracting part 29 shown in FIG. 15 performs a tracing of an outline of the candidate images generated by the candidate fetching part 21, so that a set of chain code data is generated. The outline extracting part 29 performs a linear approximation of the chain code data in such a way that errors in the chain code data fall within a range between predetermined upper and lower threshold levels. The outline extracting part 29 finally generates a set of the outline vectors. FIG. 16 shows the outline vectors after the linear approximation is done. For example, the outline of the candidate images shown in FIG. 14C is vectorized by the outline extracting part 29 into a set of outline vectors shown in FIG. 17A, and the outline of the candidate images shown in FIG. 14D is vectorized into a set of outline vectors shown in FIG. 17B. By performing the above procedure, it is possible to absorb aliasing or digital noise in the outline of the candidate images and generate the outline vectors with average changes.

Figures 17A, 17B:
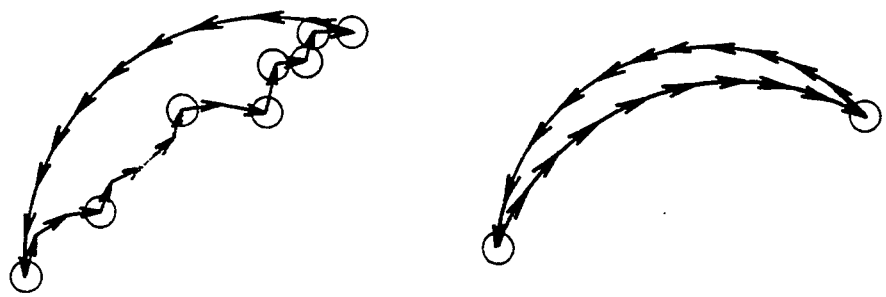
FIGS. 17A and 17B are diagrams showing examples of outline vectors extracted by the outline extracting part.

The outermost outline extracting part 30 calculates a difference in angle between successive vectors included in the outline vectors generated by the outline extracting part 29. FIG. 18A shows the results of the angular differences calculated from the outline vectors shown in FIG. 17A, and FIG. 18B shows the results of the angular differences calculated from the outline vectors shown in FIG. 17B. In these charts of FIGS. 18A and 18B, the angular difference is indicated in axis of ordinates and the number of vectors from a start point of the calculation is indicated in axis of abscissas. The value of the angular difference is positive when it is measured counterclockwise in the manner shown in FIG. 19A, while the value of the angular difference is negative when it is measured clockwise in the manner shown in FIG. 19B.

In FIGS. 17A and 17B, the outline of the candidate image includes a change point at which the direction of a following outline vector sharply changes from the direction of a preceding outline vector, and each change point in the outline is indicated by a circle in FIGS. 17A .and 17B. At each change point in the outline, the absolute value of the angular difference is larger than a predetermined threshold level as in the chart shown in FIG. 18A or 18B. An outermost outline exists between two change points in the outline. The outermost outline extracting part 30 selects a portion of the outline vectors whose angular difference has a positive, constant and relatively small value, so that an outermost outline is extracted from the outline vectors as shown in FIGS. 17A and 17B. FIG. 20A shows an outermost outline extracted by the outermost outline extracting part 30 from the outline vectors shown in FIG. 17A, and FIG. 20B shows an outermost outline extracted from the outline vectors shown in FIG. 17B.

Figure 21:
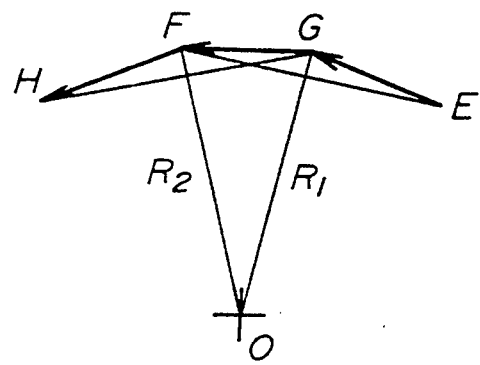
FIG. 21 is a diagram for explaining calculation of a center point of a candidate image performed by a center-point calculating part.
Figure 22A:
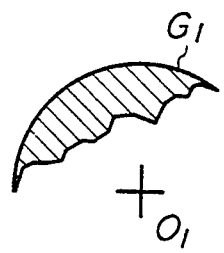
FIGS. 22A and 22B are views showing a center point of a corresponding candidate image generated by the center-point calculating part.
Figure 22B:
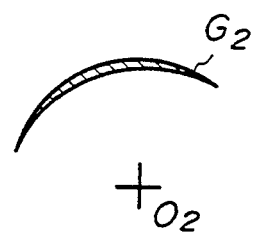

The center-point calculating part 31 generates a center point of the candidate image based on the outermost outline generated by the outermost outline extracting part 30. FIG. 21 is a diagram for explaining a calculation of the center point of the candidate image performed by the center-point calculating part 31. In FIG. 21, three outline vectors EG, GF and FH are included in the outermost outline from the outermost outline extracting part 30. The center-point calculating part 31 generates a perpendicular bisector R1 of a line segment EF based on the two adjacent outline vectors EG and GF and a perpendicular bisector R2 of a line segment GH based on the two adjacent outline vectors GF and FH. The bisector R1 is perpendicular to the segment EF, and te bisector R2 is perpendicular to the segment GH. Each of these segments is formed with a start point of one of two adjacent vectors and an end point of the other vector. Similarly, other perpendicular bisectors are generated from the remaining outline vectors in the outermost outline. The center-point calculating part 31 generates an intersection point between the two perpendicular bisectors R1 and R2 as a tentative center point of the candidate image, and generates other tentative center points from the other intersection points generated with respect to the remaining bisectors in the outermost outline. The center-point calculating part 31 averages the generated tentative center points so as to generate a center point of the candidate image. FIG. 22A shows the candidate image G1 of the punch hole in FIG. 14C and a center point O1 generated based on the candidate image G1, and FIG. 22B shows the candidate image G2 of the punch hole in FIG. 14D and a center point O2 generated based on the candidate image G2.

The geometry restoring part 32 generates a radius of the circle corresponding to the candidate image by calculating a distance between the outermost outline and the center point generated by the center-point calculating part 31, and restores a configuration of the original hole image based on the center point from the center-point calculating part 31 and based on the generated radius of the circle. The geometry judging part 33 judges whether or not the configuration of each of the candidate images is substantially the same as the configuration of a delete image owing to a hole of a document, by comparing each of the candidate images generated by the geometry restoring part 32 with the standard geometry parameters stored in the parameter ROM 11 (corresponding to the delete-image memory 20). If it is judged that the generated candidate images and the stored delete images are substantially of the same configuration, the geometry discriminating part 22 provides the candidate images each included in a minimum rectangular region, together with locations of the center points of the candidate images, and these data are supplied to the distance calculating part 23.

Figure 23:
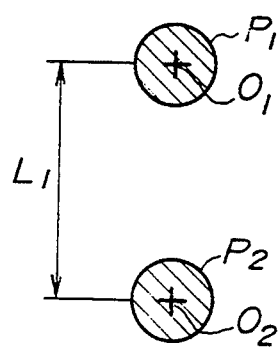
FIG. 23 is a view showing a distance between two candidate images which distance is generated by a distance calculating part.

The distance calculating part 23 generates a distance between the center points of the candidate images based on the data supplied from the geometry discriminating part 22. The discrimination part 24 detects whether or not the candidate images are delete images owing to punch holes in the scanned document, by comparing the distance calculated by the distance calculating part 23 with a predetermined standard distance between punch holes in the standard geometry parameters stored in the parameter ROM 11. FIG. 23 shows two candidate images P1 and P2 together with a distance L1 between two center points O1 and O2 of the candidate images P1 and P2. The configuration of each of the candidate images P1 and P2 is discriminated and the locations of the center points O1 and O2 are generated by the geometry discriminating part 22. The distance L1 between the center points O1 and O2 is calculated by distance calculating part 23. The discrimination part 24 detects whether or not the candidate images are delete images of punch holes, by comparing the calculated distance between the center points with the standard distance between the punch holes stored in the delete-image memory 20. If it is detected that the candidate images are delete images, the discrimination part 24 supplies data of the candidate image P1 in a minimum rectangular region and data of the candidate image P2 in a minimum rectangular region to the deletion part 25 as the delete images.

Figure 24:
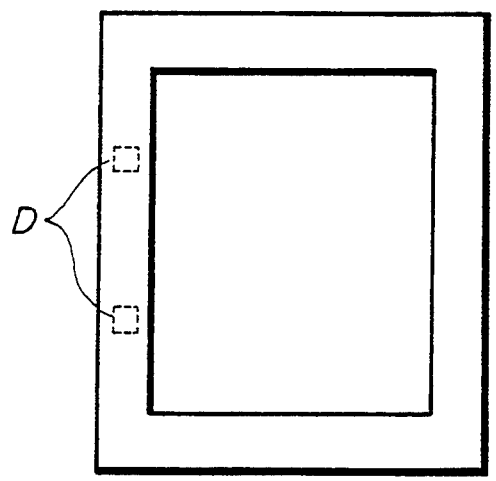
FIG. 24 is a view showing image of a document with holes stored in the image memory from which delete images are deleted by a deletion part.

Based on the data supplied from the discrimination part 24, the deletion part 25 deletes the delete images from the image of the scanned document stored in the image memory 19. FIG. 24 shows an image of a scanned document stored in the image memory 19 from which the delete images in the minimum rectangular regions D are deleted. Finally, the printer 14 (corresponding to the output part 26) outputs the image stored in the image memory 13 onto a copy paper so that the image with no undesired images is recorded onto the paper. Accordingly, it is possible for the image processing apparatus of the invention to automatically delete undesired images of punch holes and record only necessary image of a scanned document. Predetermined standard geometry parameters of delete images of punch holes which images should be deleted from the image of the scanned document are stored in the parameter ROM.

In the above described second embodiment, a configuration of a candidate image is checked with a configuration of a stored standard image after the candidate image is restored based on the calculated center point and the calculated radius of the circle. Even if the candidate image has an incomplete circular shape, it is possible to accurately detect whether or not the candidate image and the delete image are substantially of the same configuration. Then, the detected delete image is automatically deleted from the stored image of the scanned document.

Figure 25:
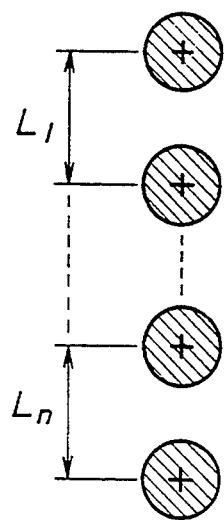
FIG. 25 is a view showing an image of more than two holes included in a document being scanned, which image is stored in the image memory.

In addition, the present invention is applicable to the case in which a document with more than two holes is scanned and processed. FIG. 25 shows image of more than two holes included in a document being scanned, which image is stored in the image memory 13. In such a case, the image processing apparatus of the invention generates a set of distances L1 through Ln between each two center points of candidate images corresponding to the plural holes in the scanned document, and detects whether or not the candidate images are actually delete images, by comparing each of the generated distances L1 through Ln with a predetermined standard distance between punch holes. By storing the standard distances between each two holes corresponding to the plural holes the delete-image memory, it is possible to safely detect whether or not the candidate images are delete images, so that the detected candidate images are automatically deleted from the stored image of the document.

Further, the present invention is not limited to the above described embodiments, and variations and modifications may be made without departing from the scope of the present invention.

What is claimed is:

1. An image processing apparatus comprising:
    scanning means;
    an image memory for storing an image of a document read out when the document is scanned by said scanning means;
    a delete-image memory for storing predetermined standard geometry parameters with respect to a delete image to be deleted from the stored image of the document, said standard geometry parameters defining a predetermined configuration of the delete image;
    candidate fetching means for fetching a candidate image from the stored image of the document in the image memory based on the standard geometry parameters stored in the delete-image memory;
    candidate rotating means for rotating the candidate image fetched by the candidate fetching means so that a longitudinal direction of the rotated candidate image accords with either a main scan line or a sub scan line of the scanning means along which the document is scanned;
    discrimination means for detecting whether or not the candidate image is a delete image, by comparing a configuration of the rotated candidate image from the candidate rotating means with the predetermined configuration of the delete image stored in the delete-image memory;
    deletion means for deleting the detected candidate image from the stored image of the document in the image memory if the discrimination means detects that the candidate image is a delete image; and
    output means for outputting the stored image in the image memory from which the detected image is deleted by the deletion means, wherein said candidate fetching means fetches a candidate image from image data stored in the image memory, said image data corresponding to a peripheral portion of the document.

2. An image processing apparatus as claimed in claim 1, further comprising a memory in which an outline data is stored, said outline data being generated by the candidate fetching means when a tracing of an outline of the candidate image is performed with respect to an X direction parallel with a main scan line and a Y direction perpendicular to the main scan line, said outline data including a minimum X coordinate of the outline, a minimum Y coordinate thereof, a length of the outline in the X direction, and a length of the outline in the Y direction.

3. An image processing apparatus comprising:
    scanning means;
    an image memory for storing an image of a document read out when the document is scanned by said scanning means;
    a delete-image memory for storing predetermined standard geometry parameters with respect to a delete image to be deleted from the stored image of the document, said standard geometry parameters defining a predetermined configuration of the delete image;
    candidate fetching means for fetching a candidate image from the stored image of the document in the image memory based on the standard geometry parameters stored in the delete-image memory;
    candidate rotating means for rotating the candidate image fetched by the candidate fetching means so that a longitudinal direction of the rotated candidate image accords with either a main scan line or a sub scan line of the scanning means along which the document is scanned;
    discrimination means for detecting whether or not the candidate image is a delete image, by comparing a configuration of the rotated candidate image from the candidate rotating means with the predetermined configuration of the delete image stored in the delete-image memory;
    deletion means for deleting the detected candidate image from the stored image of the document in the image memory if the discrimination means detects that the candidate image is a delete image; and
    output means for outputting the stored image in the image memory from which the detected image is deleted by the deletion means, wherein said candidate fetching means fetches a candidate image from the stored image of the document if it is detected that one of an X-direction length and a Y-direction length of the candidate image, whichever is greater, is greater than a predetermined minimum length and is smaller than a predetermined maximum length.

4. An image processing apparatus as claimed in claim 3, wherein said discrimination means counts black picture elements in the candidate image in an X direction parallel with a main scan line, so that a length of the candidate image in the X direction is generated if the number of the counted black picture elements at a corresponding portion is greater than a predetermined threshold value, and said discrimination means counts black picture elements in the candidate image in a Y direction parallel with a sub scan line, so that a width of the candidate image in the Y direction is generated if the number of the counted black picture elements at a corresponding portion is greater than a predetermined threshold value.

5. An image processing apparatus as claimed in claim 4, wherein maximum and minimum values of each of a width and a length of a delete image are stored in the delete-image memory as the standard geometry parameters, said discrimination means detecting that the candidate image is a delete image if each of the generated length and width of the candidate image is greater than a corresponding minimum value stored in the delete-image memory, and smaller than a corresponding maximum value stored in the delete-image memory, so that the detected candidate image in a minimum rectangular region is generated.

6. An image processing apparatus comprising:
   scanning means;
   an image memory for storing an image of a document read out when the document is scanned by said scanning means;
   a delete-image memory for storing predetermined standard geometry parameters with respect to delete images to be deleted from the stored image of the document, said standard geometry parameters defining a predetermined configuration of the delete images and a predetermined distance between the delete images;
   candidate fetching means for fetching candidate images from the stored image of the document in the image memory based on the standard geometry parameters stored in the delete-image memory;
   geometry discriminating means for detecting whether or not a configuration of each of the candidate images from the candidate fetching means is substantially the same as the predetermined configuration stored in the delete-image memory;
   distance calculating means for calculating a distance between the candidate images based on the data generated by the geometry discriminating means;
   discrimination means for detecting whether or not the candidate images from the candidate fetching means are delete images by comparing the calculated distance from the distance calculating means with the predetermined distance stored in the delete-image memory;
   deletion means for deleting the detected candidate images from the discrimination means from the stored image of the document in the image memory if the discrimination means detects that the candidate images are delete images; and
   output means for outputting the stored image of the document in the image memory from which the detected images are deleted by the deletion means.

7. An image processing apparatus as claimed in claim 6, further comprising a memory in which an outline data is stored, said outline data being generated by the candidate fetching means when a tracing of an outline of each of the candidate images is performed with respect to an X direction parallel with a main scan line and a Y direction perpendicular to the main scan line, said outline data including a minimum X coordinate of the outline, a minimum Y coordinate of the outline, a length of the outline in the X direction, and a length of the outline in the Y direction.

8. An image processing apparatus as claimed in claim 6, wherein said candidate fetching means fetches candidate images from the stored image of the document if it is detected that one of an X-direction length and a Y-direction length of each of the candidate images, whichever is greater, is greater than a predetermined minimum length and is smaller than a predetermined maximum length.

9. An image processing apparatus as claimed in claim 6, wherein said geometry discriminating means comprises:
   outline extracting means for extracting an outline from each of the candidate images fetched by the candidate fetching means;
   outermost-outline extracting means for extracting an outermost outline from the outline of each of said candidate images extracted by the outline extracting means;
   center-point calculating means for calculating a center point of each of the candidate images from the outermost outline extracted by the outermost outline extracting means;
   geometry restoring means for restoring a configuration of each of the candidate images based on the calculated center point from the center-point calculating means and based on a distance between said center point and said outermost outline from the outermost-outline extracting means; and
   geometry judging means for detecting whether or not a configuration of each of the candidate images from the candidate fetching means is substantially the same as the predetermined configuration of the delete images, by comparing the restored configuration from the geometry restoring means with the predetermined configuration stored in the delete-image memory.

10. An image processing apparatus as claimed in claim 9, wherein said outermost-outline extract means generates an outermost outline of the candidate images based on differences in angle between two successive vectors of a set of outline vectors which form the outline of each of the candidate images.

11. An image processing apparatus as claimed in claim 9, wherein said center-point calculating means calculates a center point of each of the candidate images by averaging intersection points between two of perpendicular bisectors with respect to line segments selected from outline vectors forming the outermost outline.

* * * * *